United States Patent
Franta

(10) Patent No.: US 6,425,475 B1
(45) Date of Patent: Jul. 30, 2002

(54) METHOD AND APPARATUS FOR ROTATING AN ARTICLE, MORE PARTICULARLY FOR ROTATING A FOLDING CARTON HAVING THE SHAPE OF A CUBOID

(75) Inventor: Georg Franta, Obergünzburg (DE)

(73) Assignee: Helmut Seidel, Walluf (DE)

( * ) Notice: Subject to any disclaimer, the term of this patent is extended or adjusted under 35 U.S.C. 154(b) by 0 days.

(21) Appl. No.: 09/506,355

(22) Filed: Feb. 17, 2000

(30) Foreign Application Priority Data

Feb. 19, 1999 (DE) .......................................... 199 06 882

(51) Int. Cl.$^7$ .............................................. B65G 47/24
(52) U.S. Cl. ....................................... 198/415; 198/412
(58) Field of Search ................................. 198/415, 412

(56) References Cited

U.S. PATENT DOCUMENTS

| | | | | |
|---|---|---|---|---|
| 3,306,424 A | * | 2/1967 | Fahrenbach ................. | 198/415 |
| 3,432,023 A | * | 3/1969 | Lucas .......................... | 198/415 |
| 3,557,933 A | * | 1/1971 | Sopher ......................... | 198/33 |
| 3,576,247 A | * | 4/1971 | Caulford ...................... | 198/33 |
| 4,085,839 A | * | 4/1978 | Crawford ..................... | 198/410 |
| 4,164,281 A | * | 8/1979 | Schnier ....................... | 198/394 |
| 4,854,441 A | * | 8/1989 | McBrady et al. ............ | 198/384 |
| 5,074,400 A | * | 12/1991 | Focke et al. ................ | 198/415 |
| 5,109,975 A | * | 5/1992 | Prettie ........................ | 198/411 |
| 5,172,800 A | * | 12/1992 | Brown et al. ............... | 198/380 |
| 5,183,144 A | * | 2/1993 | Francioni .................... | 198/382 |
| 5,301,793 A | * | 4/1994 | Kovacs ....................... | 198/415 |
| 5,316,123 A | * | 5/1994 | Achelpohl .................. | 198/416 |
| 5,341,912 A | * | 8/1994 | Focke et al. ................ | 198/415 |
| 5,343,998 A | * | 9/1994 | Depinet et al. ............. | 198/415 |
| 5,355,991 A | * | 10/1994 | Baranowski ................ | 198/412 |
| 5,358,092 A | * | 10/1994 | Cinotti ....................... | 198/415 |
| 5,411,250 A | * | 5/1995 | Belec et al. ................ | 271/185 |
| 5,660,262 A | * | 8/1997 | Landrum et al. ........... | 198/411 |
| 5,664,661 A | * | 9/1997 | Maier ......................... | 198/412 |
| 5,673,782 A | * | 10/1997 | Wheeler et al. ............ | 198/411 |

FOREIGN PATENT DOCUMENTS

| | | |
|---|---|---|
| DE | 19636981 | 3/1998 |
| EP | 0074129 | 3/1983 |
| EP | 0472984 | 8/1991 |
| EP | 0367940 | 5/1993 |

* cited by examiner

*Primary Examiner*—Christopher P. Ellis
*Assistant Examiner*—Rashmi Sharma
(74) *Attorney, Agent, or Firm*—Price, Heneveld, Cooper, DeWitt & Litton

(57) ABSTRACT

The invention relates in the first instance to a method for rotating an article which has an underside and lateral surfaces, more particularly for rotating a folding carton having the shape of a cuboid. The article is conveyed along a first lane (1), then rotated in order to re-align the article, and then conveyed along a second lane (2) which extends in the direction of the first lane. The rotation of the article takes place under the action of an element (30) which is in contact with a lateral surface of the article.

To enable the rotation of the article to take place in a very tight space at a high conveying speed, it is proposed that the contact element (30) moves in the direction of the lanes (1, 2), being moved against the rear lateral surface of the article, based on the direction in which the article is being conveyed, and being in rolling contact therewith (roller 39).

In the case of the apparatus for implementing the method it is regarded as essential for the contact element to be mounted in a revolving conveyor device (23, 24) which has a conveying line (26) extending parallel to the conveying direction of the first lane, the contact element incorporating a freely rotatable roller (39).

41 Claims, 9 Drawing Sheets

METHOD AND APPARATUS FOR ROTATING AN ARTICLE, MORE PARTICULARLY FOR ROTATING A FOLDING CARTON HAVING THE SHAPE OF A CUBOID

The invention relates to a method and apparatus for rotating an article, more particularly f or rotating a folding carton having the shape of a cuboid.

It is known for packaging machines to first of all set the carton blank upright in such a way as to form the bottom section, and the longitudinal and end wall sections of the folding carton which are disposed perpendicularly thereto. The longitudinal wall sections and transverse wall sections are joined together by, for example, stapling or gluing end wall sections to one another. As a general rule these operations are carried out while the carton blank is being carried along in a direction in which the longitudinal wall sections, seen in longitudinal extension thereof, are conveyed in the conveying direction. The lid section is then bent back and thus closes the opening in the loaded folding carton. It now only remains to fold down wall sections, which are hinged to the lid section, from their horizontal alignment into vertical alignment and to join them to the end wall sections, for example by stapling or gluing them. So that these final operations in forming the folding carton can be done from the side, based on the direction in which the folding carton is being conveyed, it is necessary to first rotate the folding carton about a vertical axis, in particular through 90°.

From EP 0 074 129 there is known a method for rotating an article that has a lower surface and lateral surfaces, in particular for rotating a folding carton in the shape of a cuboid, wherein the article is conveyed along a first lane, is turned to enable the article to be re-aligned and is carried along a second lane which runs in the direction of the first lane; the rotation of the article takes place under the action of an element that is in contact with one lateral surface of the article. There the element in contact, hereinafter referred to as the contact element, is horizontally aligned and mounted so as to be able to pivot about a vertical axis in such a way that the contact element is permanently revolving and the speed at which it revolves is harmonised with the speed of travel of the individual, partially formed folding cartons being continuously conveyed by the packaging machine. In the case of the foregoing apparatus for rotating the article, the first lane is laterally offset with respect to the second lane towards the apparatus for rotating the article. The article to be rotated, which is aligned lengthways in relation to the direction of travel of the first lane, arrives in the zone of the contact element, which moves against the leading area of the side wall section of the folding carton and thereby causes excursion of the folding carton relative to the first lane's direction of travel. Disposed above this lane is a friction plate with brushes which make contact with and brake the lid area of the folding carton as it passes through the packaging machine; the action of the brushes may be seen as a kind of torque which provides the principal contribution to rotating the folding carton. The contact element which carries on swivelling, continuing to bear against the longitudinal wall of the folding carton, has the effect of causing a further excursion and thus rotation of the folding carton, until said contact element has reached a position perpendicular to the direction of travel of the first lane. Complete rotation of the folding carton is brought about by means of driving dogs belonging to the second lane. A first driving dog of the second lane, disposed on the side of the lane that is nearest to the contact element, trails behind and comes up against the trailing longitudinal wall section of the folding carton and carries the latter along. The driver on the other side of the second lane only subsequently comes into contact with the trailing longitudinal wall section, with the result that the folding carton, which has now been rotated through 90°, is conveyed onward by the pair of drivers, before also being closed in the region of the end wall sections.

This method and apparatus for rotating the article have the drawback that the contact element only brings about an ancillary rotational movement to produce initial excursion of the folding carton from its direction of travel and makes contact with one longitudinal wall section of the packing box. The principal rotational movement of the folding carton, on the other hand, is initiated by the brushes. Besides, it is absolutely crucial for the complete rotation of the folding carton through the desired 90° to be accomplished by means of the trailing driver on the second lane. As a consequence of all this, the folding carton needs an extremely long conveyor line in order for it to be rotated. This in turn means that the packaging machine must have a great constructional length and this entails increased costs, both from the point of view of the space taken up by the packaging machine and from the point of view of the costs of building the packaging machine. A further drawback is the fact that it is only possible to convey at relatively low conveying speeds, for the diverse constructional elements outlined above for rotating the article need to be harmonised in terms of their motion. Apart from this, the contact element bears with friction against the folding carton, which means that it is not impossible for the folding carton destined to be swung out by means of the contact element from the direction of travel to be damaged in the associated long wall section or at least for the quality of its surface to be impaired.

Methods and machines for rotating an article, in particular for rotating a package or folding carton in the shape of a cuboid, are also known from EP 0 367 940 B1, EP 0 472 984 A1, DE 196 36 981 A1, U.S. Pat. No. 4,085,839 and U.S. Pat. No. 5,660,262.

SUMMARY OF THE INVENTION

It is the object of the present invention to indicate a method and apparatus for rotating an article, by which it is possible for the article to be rotated within an extremely confined space even at a high conveying speed.

The object is achieved by a method for rotating an article that possesses an underside and lateral surfaces, more particularly for rotating a folding carton in the shape of a cuboid, where the article is conveyed along a first lane, is turned to enable the article to be re-aligned, and is conveyed along a second lane which runs in the direction of the first lane, and the rotation of the article takes place under the action of an element that is in contact with a lateral surface of the article; the crux of the invention is to be seen in the fact that the element is moved in the direction of the lanes, being moved against the rear lateral surface of the article, based on the article's direction of travel, and makes rolling contact with the latter.

In the case of the apparatus according to the invention, the contact element is thus not adapted to rotate about a fixed axis, but is moved in the direction of the lanes. It is thus able to follow the movement of the article in the direction of travel as the article, notably the folding carton, is being conveyed through the packaging machine, and operates permanently on said article. This action is a rolling action, readily enabling a relative movement to take place between said article and the contact element as the article is rotating. The fact that the rolling contact does not generate friction forces between the contact element and the article ensures that the lateral surface of the article, against which the contact element bears, does not become damaged or its appearance impaired from an aesthetic point of view. The rolling contact with the article is an essential pre-requisite for the packaging machine to be operated at high conveying speeds.

The method in accordance with the invention is also distinguished by the fact that the contact element is moved against the rear lateral surface of the article, based on the article's direction of travel. As the article is being conveyed by means of the first lane into the area of the rotation device, it is grasped from behind in this area by the contact element, via which as the contact element moves towards the lanes the point of application of the contact element on the article induces a torque in the latter, the result of which is to transmit a pushing force into the article. This force causes the article to immediately rotate in the shortest possible area. The rotation of the article can thus be brought abuot solely and exclusively by means of the contact element. It is preferred if in order to rotate the article the contact element is moved against the rear lateral surface of said article, adjacent to a lateral surface of the article that extends towards the lanes, thereby producing an eccentric point of application of the contact element against the article. Ancillary means that contribute to the rotation of the article may be provided. Thus, for example, as the article rotates the area of the article that is situated opposite the region in which the contact element and the article are in contact may be conveyed more slowly with a component of motion towards the lanes than is the contact area, by virtue of the fact that friction acts upon the side of the article that is situated opposite the contact area, and/or the lower face and/or the upper face of the article.

Particularly when a folding carton in the shape of a cuboid is to be rotated, it will be standard procedure for the rotation of the article to produce re-alignment of the article turned through approx. 90°.

One preferred refinement of the method according to the invention proposes that a supporting element be moved towards the lanes, the supporting element, based on the direction of motion of the contact element, being disposed to the rear thereof, and the rear lateral surface of the article being in rolling contact with said supporting element as it is re-aligned. Thus, for instance, it is a particular problem to guide the newly aligned article in a stable manner. In the case of conventional packaging machines this is done by means of lateral guide rails as a general rule. However, these follow the contours of the machine's rotational area and necessitate a very great constructional length. In addition there is the fact that as a general rule the complete rotation of the article is effected by the driving dogs belonging to the second lane which were described in the introduction in the discussion of the prior art; this likewise has the drawback of increasing the constructional length of the machine. The presence of the supporting element means that it is not necessary for the rotated article to be guided on the side of the rotation device by means of guide rails. Instead, it is the contact element which causes the article to rotate. Once the article has been rotated into the newly aligned position, the supporting element makes additional, rolling contact with the rear lateral surface of the article, which following rotation is now disposed laterally, based on the article's direction of travel. The distance between the contact element and the supporting element ensures a lateral guide for the article which moves with the article. At this instant the article is already moved onwards by means of the second lane, thereby enabling the lateral guide to convey it by means of the contact element and the supporting element in a straightforward manner into the zone of a flush lateral guide on the second lane, which is configured in the manner of a guide rail.

In accordance with one special feature of the method according to the invention, provision is made for the contact element and/or the supporting element to travel in a revolving fashion. This is intended for use particularly where a plurality of contact element and supporting element pairs are joined to a chain conveyor.

At least when the rotational movement of the article ends, it must be ensured that the latter is guided on the side of the packaging machine that lies opposite the rotation device. This can be done by a guide rail aligned substantially in the direction of travel. The guidance of the article may be optimised in this zone, thereby even helping to rotate the article by the fact that as the article rotates the vertical edge thereof that is diametrically opposed to the contact area of the contact element is introduced between two rollers adapted to rotate about vertical axes, the rollers making contact with the two lateral surfaces contiguous with this vertical edge. Thus as the article is conveyed, a quasifixed point about which the article is rotated is created on the side opposite the rotation device; the contact element moves the area of the article nearest thereto in the direction of travel and consequently pivots the article about the fixed point. The freely rotatable bearing of the rollers makes it possible to operate on both lateral surfaces of the article in the vicinity of the vertical edge without damaging it. Thanks to the unimpeded slight roll-off action on the lateral surfaces of the article, the rollers are able to execute compensating movements during the rotation. The article is thus held laterally exclusively by means of the various rollers. The leading roller in the direction of travel conveys the article into the vicinity of a further guide rail by means of the second lane, thereby guiding the rotated article in the vicinity of the two end faces as it is conveyed onward through the packaging machine. The onward transfer of the article for example takes place in the conventional manner using drivers which engage behind the article in the area of the trailing longitudinal wall.

Particularly when articles are conveyed at a relatively low speed through the packaging machine, as a general rule the rotation of the article will already have been achieved after a very short conveying distance, that is to say before the vertical edge of the article is introduced between the two rollers. From this point of view a guide for the vertical edge of the article diametrically opposed to the contact area of the contact element should also be provided before the area of the two rollers. Since the article is still being rotated, this guide does not need to be arranged parallel to the direction of travel, but may stretch conically towards the trailing rotatable roller relative to the direction of travel. Conversely, at high conveying speeds the location of the two rollers should be harmonised in such a manner that the vertical edge is introduced between the two rollers.

One preferred design of the apparatus for carrying out the method according to the invention provides for the contact element to be mounted in a revolving conveyor device which has a conveying line running parallel to the direction of travel of the first lane in the direction of travel thereof; the contact element has a freely rotatable roller. Preferred refinements of the apparatus, relating to the design of the supporting element, the mounting of the contact and supporting element in the conveyor device, the arrangement of the two lanes and the device for facilitating the rotational movement imparted to the article by means of the contact element, are detailed in the subsidiary claims.

The invention thus proposes a method and apparatus that ensures that an article is rotated within an extremely small space at a high travelling speed. This is basically done by means of the contact element. The rotational action may be helped by a device that operates on the article and brings about a braking effect. In addition the counter-bearing represented by the two rollers may be provided, between which the article's vertical edge defined above is introduced. All this helps to enable the article to be rotated in an extremely small space even at particularly high travelling speeds. This makes it possible to construct a packaging machine of very small constructional length compared to rival products, thereby resulting in low building costs.

Further features of the invention are represented in the subsidiary claims, in the Description of the Figures, and in the Figures themselves, it being noted that all individual features and all combinations of individual features are essential to the invention.

The invention is represented by way of example by means of one fundamental form of embodiment thereof, though without being confined thereto, in the Figures, wherein:

FIG. 3 shows the initial conveying and rotation of the folding carton by means of the contact element, viewed from the direction of the rotation device;

FIG. 4 shows the folding carton having already largely rotated by means of the contact element, viewed from the direction of the rotation device;

FIG. 5 shows the situation depicted in FIG. 4, viewed from the side of the packaging machine opposite to the rotation device;

FIG. 6 shows the folding carton after it has been rotated through 90°, seen from the same direction as in FIG. 5;

FIG. 7 shows how the rotated folding carton is carried away by means of two drivers which form part of a conveying line, seen from the direction of the rotation device;

in FIG. 8 this is viewed from the rotation device and in FIG. 9 from the side opposite to the rotation device.

DETAILED DESCRIPTION OF THE PREFERRED EMBODIMENT

Figure 1:
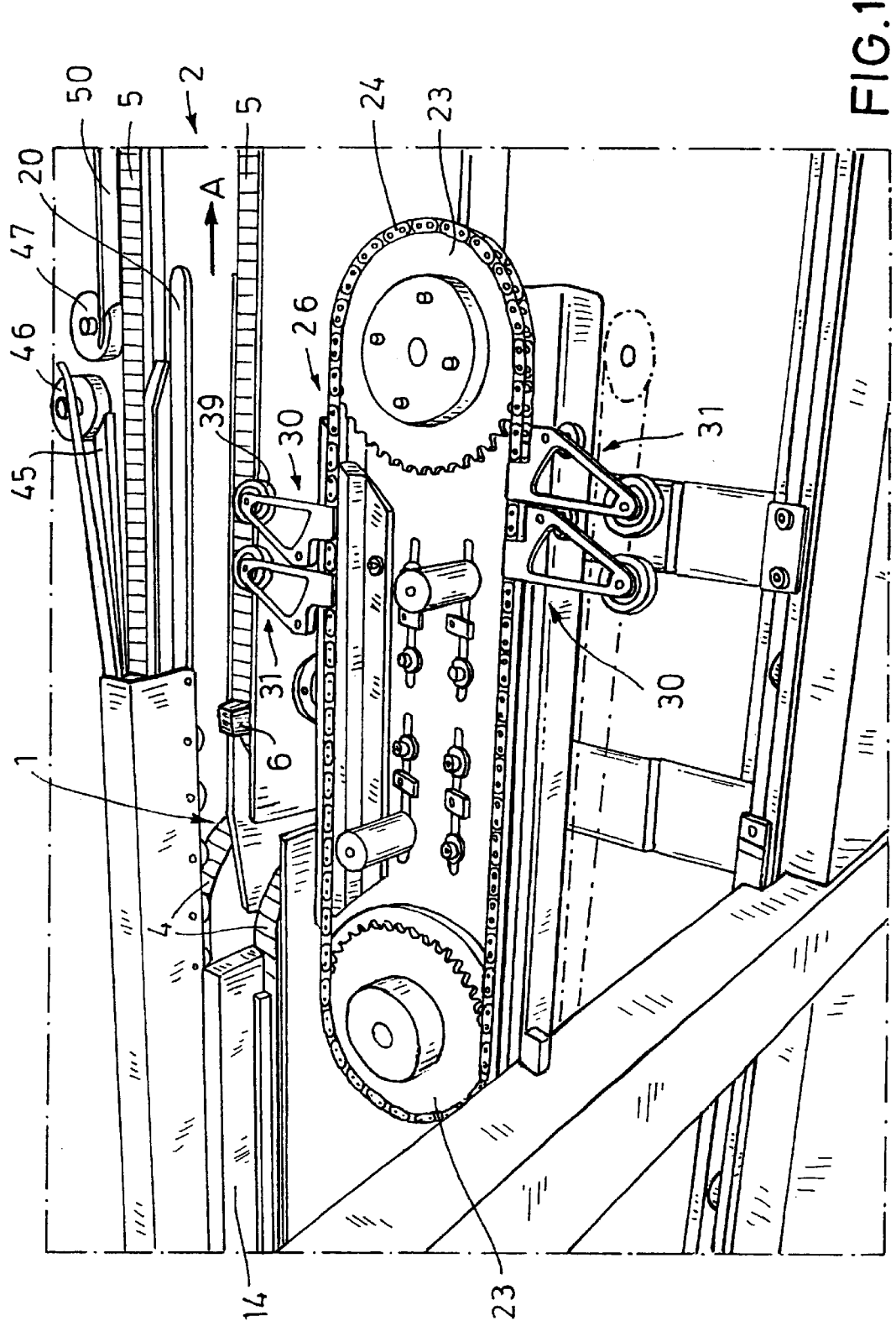
FIG. 1 shows a three-dimensional view of an excerpt from a packaging machine equipped with the rotation device.

FIGS. 1, 3 to 7 show a first, narrow lane 1 for conveying a cuboid, longitudinally aligned, folding carton 7 in conveying direction A and a second, broad lane 2 for conveying the folding carton, which has now been rotated through 90° and is transversely aligned, in this conveying direction A. Arranged alongside the two lanes 1 and 2 is the rotation device 3; this only slightly overlaps the conveying section of the first lane 1, and is thus more particularly disposed in the vicinity of the second lane 2. The first lane 1 is offset laterally to the second lane 2 and disposed nearer to the rotation device 3. Each lane, 1 and 2 respectively, has two plastics chains, 4 and 5 respectively, to receive the folding cartons 7, and the upper side of the chains in each case rests on a base (not shown). The respective chain 5 is provided with a plurality of pairs of drivers 6, and the drivers 6 of the respective pair are aligned flush with one another perpendicularly to the conveying direction of the lane, 1 and 2 respectively. In the region of the first lane 1 the folding carton is transferred between the two plastics chains 4 of said lane and an upper runner arranged above the chains 4. The plastics chains 4 are thus not provided with drivers 6. The means for driving the plastics chains 4 and 5 are not shown in the Figures.

Figure 3:
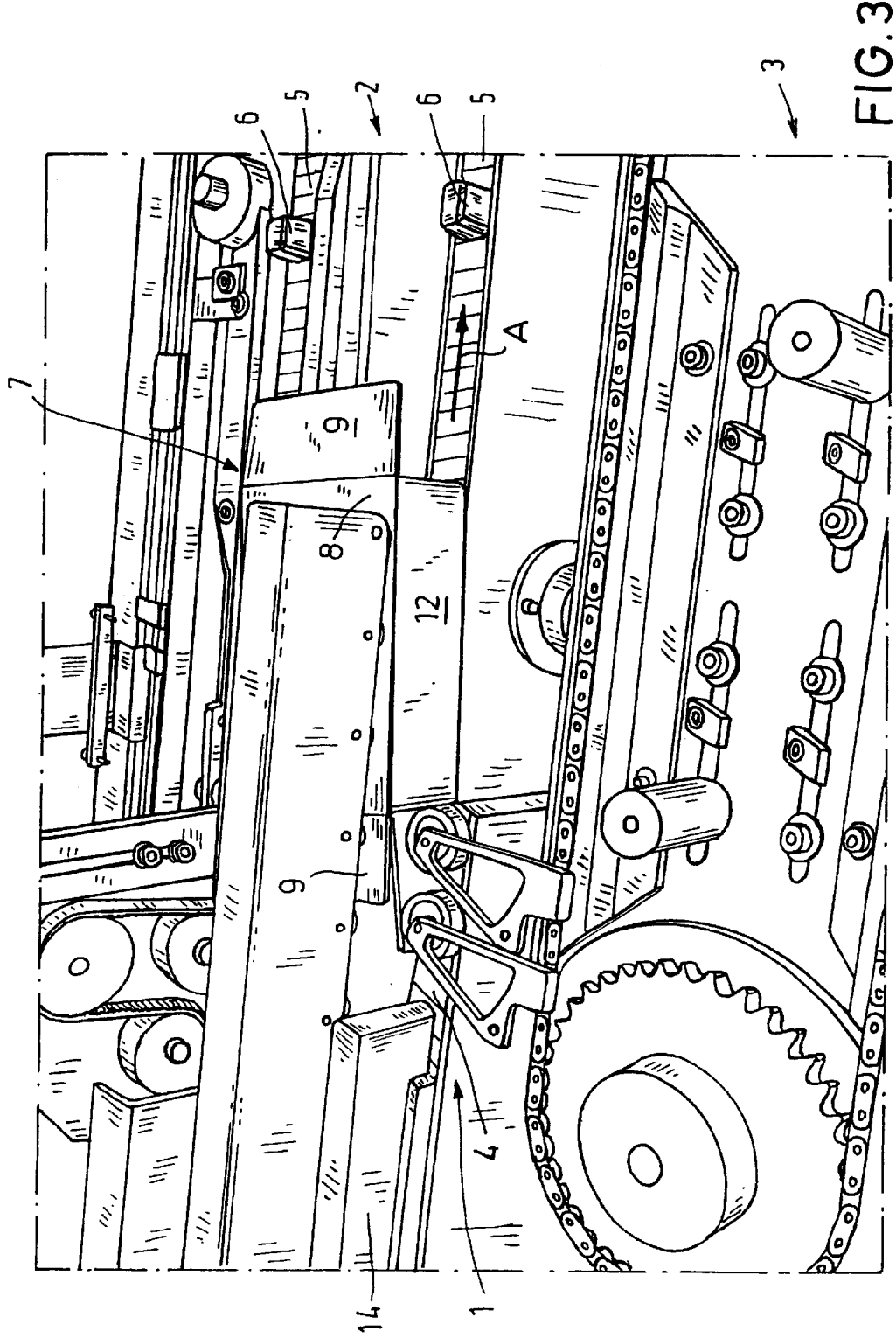
FIGS. 3 to 7 show three-dimensional views of individual process steps of a first operation for rotating a folding carton in the region of the rotation device, viz.
Figure 4:
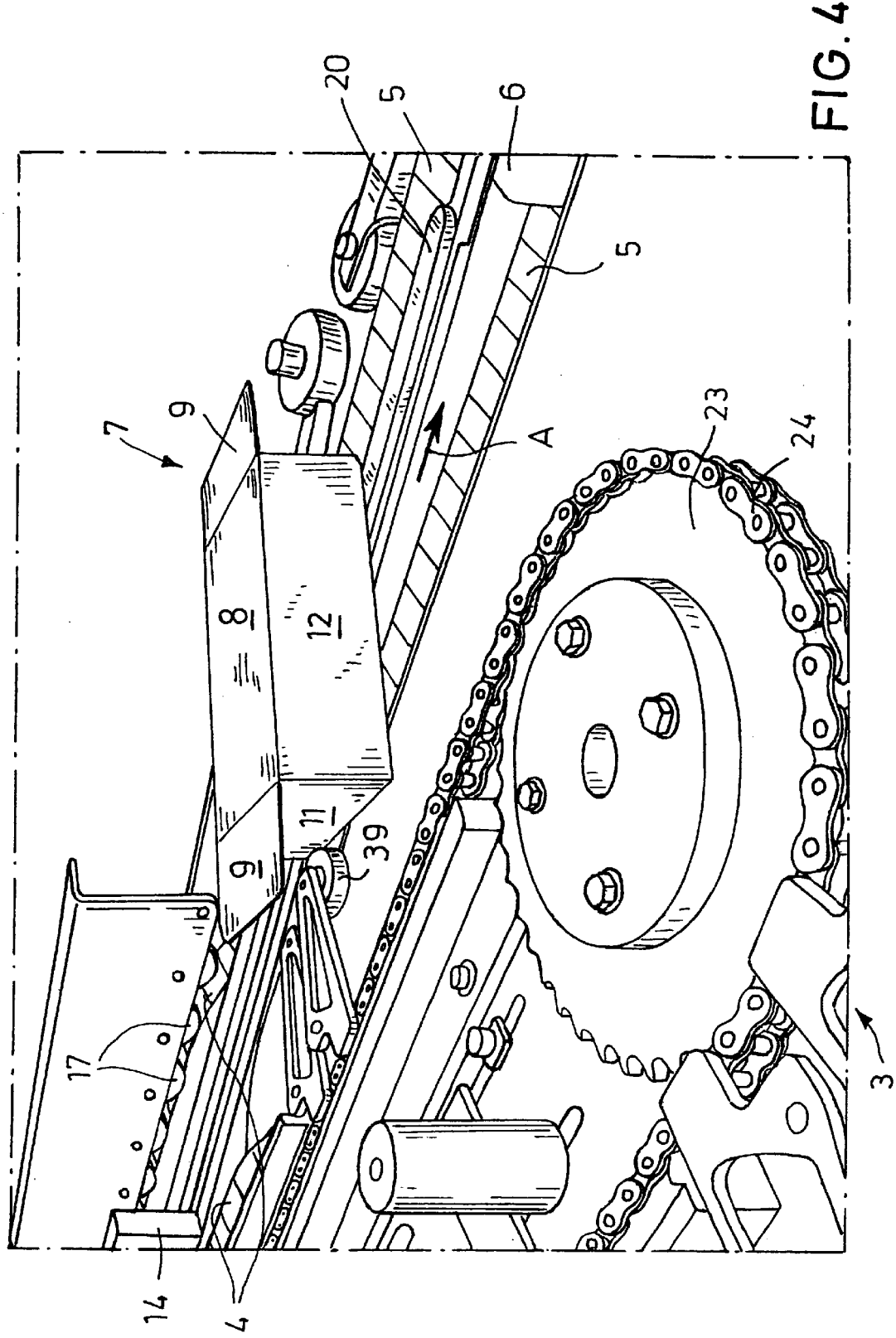

Based on the conveying direction A, the respective folding carton 7 is conveyed into the zone of the leading end of the first lane 1. The folding carton 1 exhibits the shape shown in particular in FIG. 3. It is folded so far forward that after the folding carton 7 has been rotated, the end tab sections 9 which adjoin the lid section 8 remain only to be bent downwards and joined to the front lateral section 10 and the rear lateral section 11 of the packing box, more particularly glued thereto. Based on the position of the folding carton 7 as shown in FIG. 3, the long lateral section nearest to the rotation device 3 is identified by reference number 12, and the other long lateral section, remote therefrom, is identified by reference number 13. The Figures do not show the bottom section of the folding carton 7 which joins the lateral sections 10 to 13.

As may be taken from individual Figures, the folding carton 7 is guided in the region of the first lane 1 on the side nearest to the rotation device 3, i.e. in the vicinity of the lateral section 12, by a guide rail 14. Conversely, the opposing lateral section 13 is guided in the vicinity of the first lane 1 by means of a series of rollers consisting of individual rollers 15 which are arranged close together one behind the other in the conveying direction A and are adapted to rotate freely about vertical axes. Arranged above the conveying plane of the first and second lanes 1, 2, stretching from the zone of the front end of the first lane 1 to slightly into the trailing zone of the second lane 2, is a roller lane 16 whose individual rollers are mounted so as to rotate freely about horizontal axes. The roller lane 16 is positioned parallel to the conveying plane of the lanes 1, 2 and is adjustable in height; said height should be chosen in such a way that as the folding carton 7 passes through the rollers 17, these keep the lid section 8 and the tab sections 9 horizontal.

Arranged parallel to the roller lane 16, and likewise adjustable in height, are two rollers 18 which as the folding carton 7 is conveyed in the front end zone of the lane 1 run adjacent to the lateral section 13 of the folding carton 7, on the lid section 8 thereof. From the view seen in FIGS. 5 and 6 it can be taken that the rollers 18 are acted upon frictionally by means of springs 19, which means that although they are able to rotate they can only do so if a certain torque is initiated. The consequence is that when passing the rollers 18, in the contact zone of the rollers 18 and of the lid section 8 a braking force acting contrary to the conveying direction A is introduced into the folding carton 7. In the leading end region of the first lane 1 and the trailing end region of the second lane 2, i.e. in the region in which the rotation device 3 is operative, there is arranged between the chains, 4 and 5 respectively, a carrier rail 20 which in the region of its end nearest to the first lane 1 is mounted so as to pivot about a vertical axis. The carrier rail 20 has an upper receiving surface 21 which is situated on a slightly higher level than the receiving level of the plastics chains 5 of the second lane 2, with the result that, taking account of minor tilting operations of the folding carton 7, the folding carton 7 with its contents only rests with a relatively light weight on the second lane 2 and due to this load relief the rotating operation is preferably able to take place by virtue of the weight largely being supported on the smooth carrier rail 20. In order to allow it to be converted to take different packing box formats, the conveying width of the second lane 2 is adjustable, which means that as a result of the swivel-type mounting of the carrier rail 20 the end thereof that projects between the plastics chains 5 can be adjusted to suit the widthwise dimensions of the lane 1. In this zone the carrier rail 20 rests on a base.

The rotation device 3 and its mode of operation will now be described in detail, referring also to the view seen in FIG. 2:

The rotation device 3 has two sprocket wheels 23 mounted in vertical shafts 22; the shaft 22 disposed in the region of the second lane 2 is driven. The driving means are not illustrated further and contain an adjustable electric motor and a step-down gear system. The sprocket wheels 23 are encircled by a metal chain 24. On the side of the rotation device 3 nearest to the lanes 1 and 2, a guide rail 25 is arranged parallel to the lanes 1 and 2, between the sprocket wheels 23 in the region of the straight chain section 26. On the side furthest from the chain section 26 and the lane 2, this guide rail 25 has a vertical guide surface 27. The frame which supports the shafts 22, the drive units for the shafts 22 and the guide rail 25 is identified by reference number 28. The direction in which the chain revolves, based on the chain section 26, is indicated by an arrow A. Directed outwards, the chain 24 receives three pairs of elements 29 which are spaced apart from one another by the same length of chain in each case. Each element pair has two identically configured elements which are attached to the chain 24 and which are identified as a leading contact element 30 and a trailing supporting element 31. Each element 30 has a plate-shaped basic body 32 which is constituted by a rectangular section 33 and a section 35 configured in the manner of a right-angled triangle. The basic body 32 is placed by its section 33, the length of which substantially matches that of a link 34 of the chain 24, onto the chain and is mounted in the two link pins 36 of the associated chain link 34, thereby constituting a permanent connection of the chain link 34 and the associated basic body 32. The leading edge 37 of the basic body 32, based on the straight section of chain 26, is aligned perpendicular to the direction in which the chain 24 runs. In the area of the acute angle of the section 35, the basic body 32 receives a downwardly directed vertical shaft 38. Mounted in a freely rotatable manner in the latter is a cylindrical roller 39 which projects past the external contour of the pointed area of the basic body 32. The other corner of the triangular section 35 receives a shaft 40 which extends parallel to shaft 38 and is again directed downwards. Mounted so as to be freely rotatable in this shaft 40 is a cylindrical roller 41. The roller 41 juts past the external contour of the basic body 32. In its zone furthest from the leading edge 37, the basic body 32 is provided with a flattened area 43 which runs parallel to the leading edge 37. The elements 30 and 31 of each pair of elements 29 are joined to the chain 24 in such a way that a chain link 34 is left free therebetween.

Figure 2:
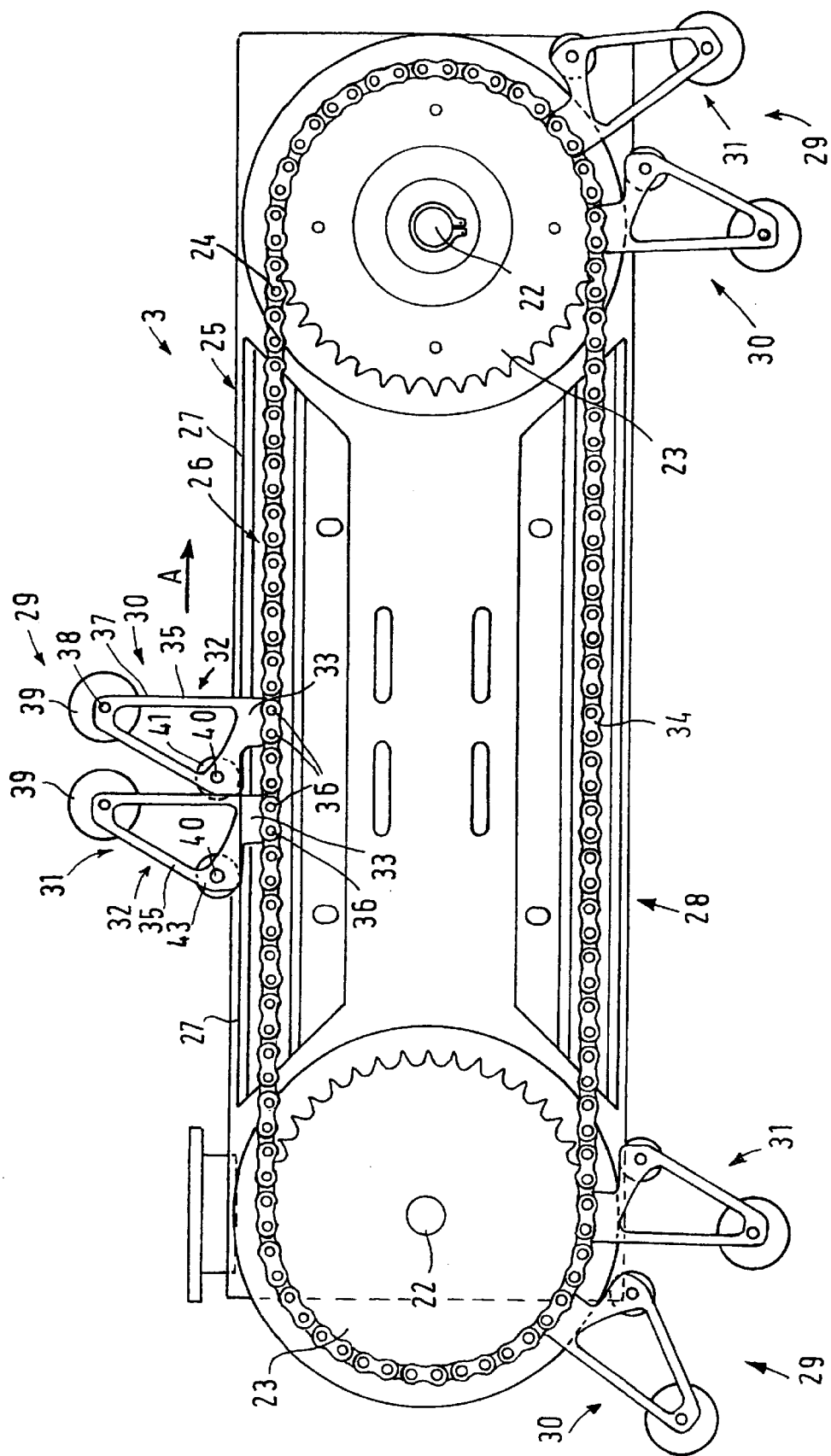
FIG. 2 shows the rotation device from FIG. 1 in a plan view.

As can be taken from the view seen in FIG. 2, this arrangement in the chain 24 reversal area causes the elements 30, 31 of the respective pair 29 of elements to be splayed apart. When element pair 29 leaves the area of the sprocket wheels 23, only the trailing sprocket wheel being predominantly of interest, the fact that the chain is transferred into the taut position as in the case of the straight chain section 26 on the one hand causes the contact element 30 to be supported in the region of the flattened portion 43 against the leading edge 37 of the following supporting element 31, and on the other hand causes the rollers 41 of the two elements 30 and 31 in the region of the guide rail 25 to roll off along the guide surface of said rail. With the chain 24 tensioned, this ensures exact positioning of contact element 30 and support element 31 in the region of the straight chain section 26.

Figure 5:
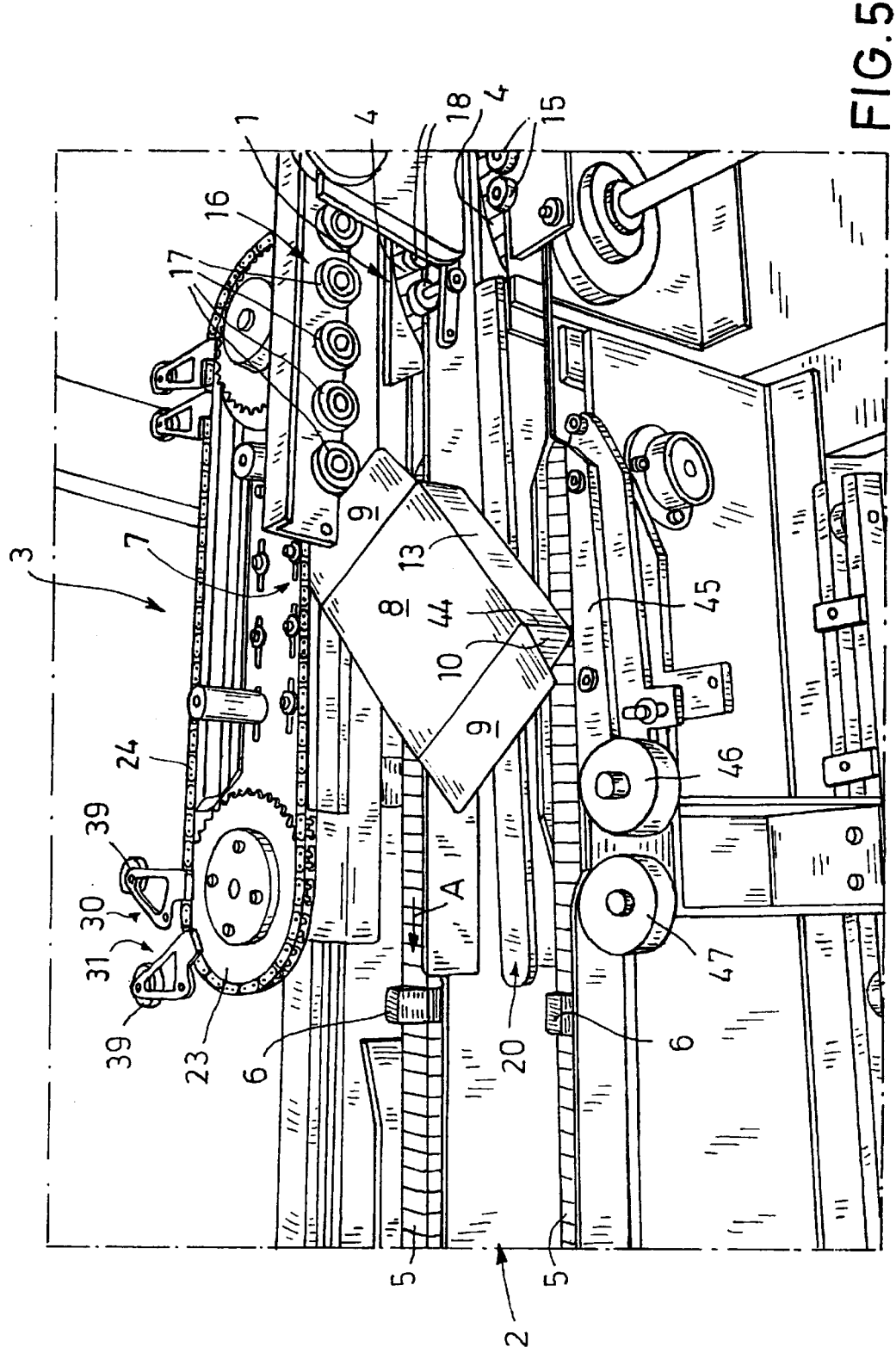
Figure 6:
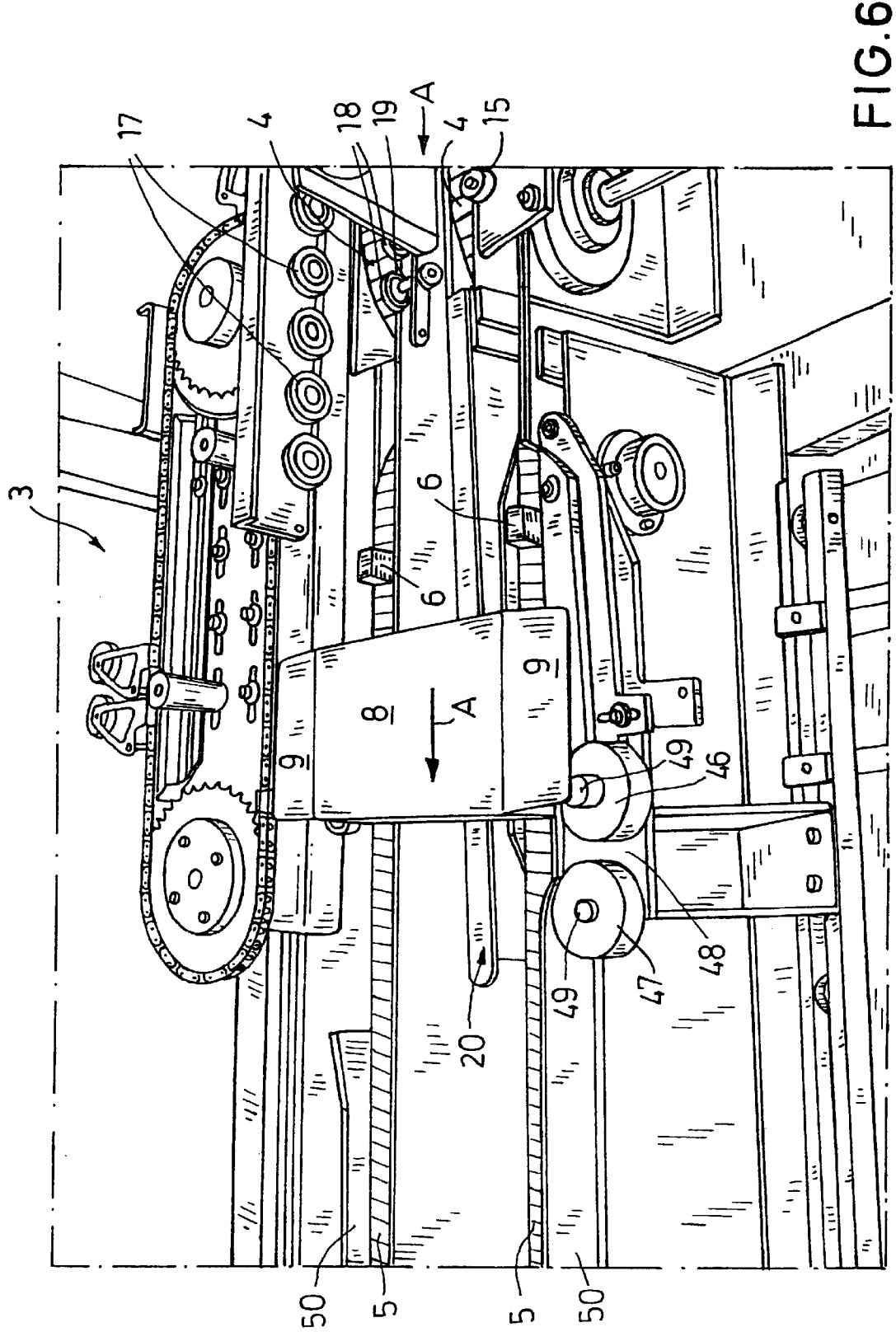
Figure 7:
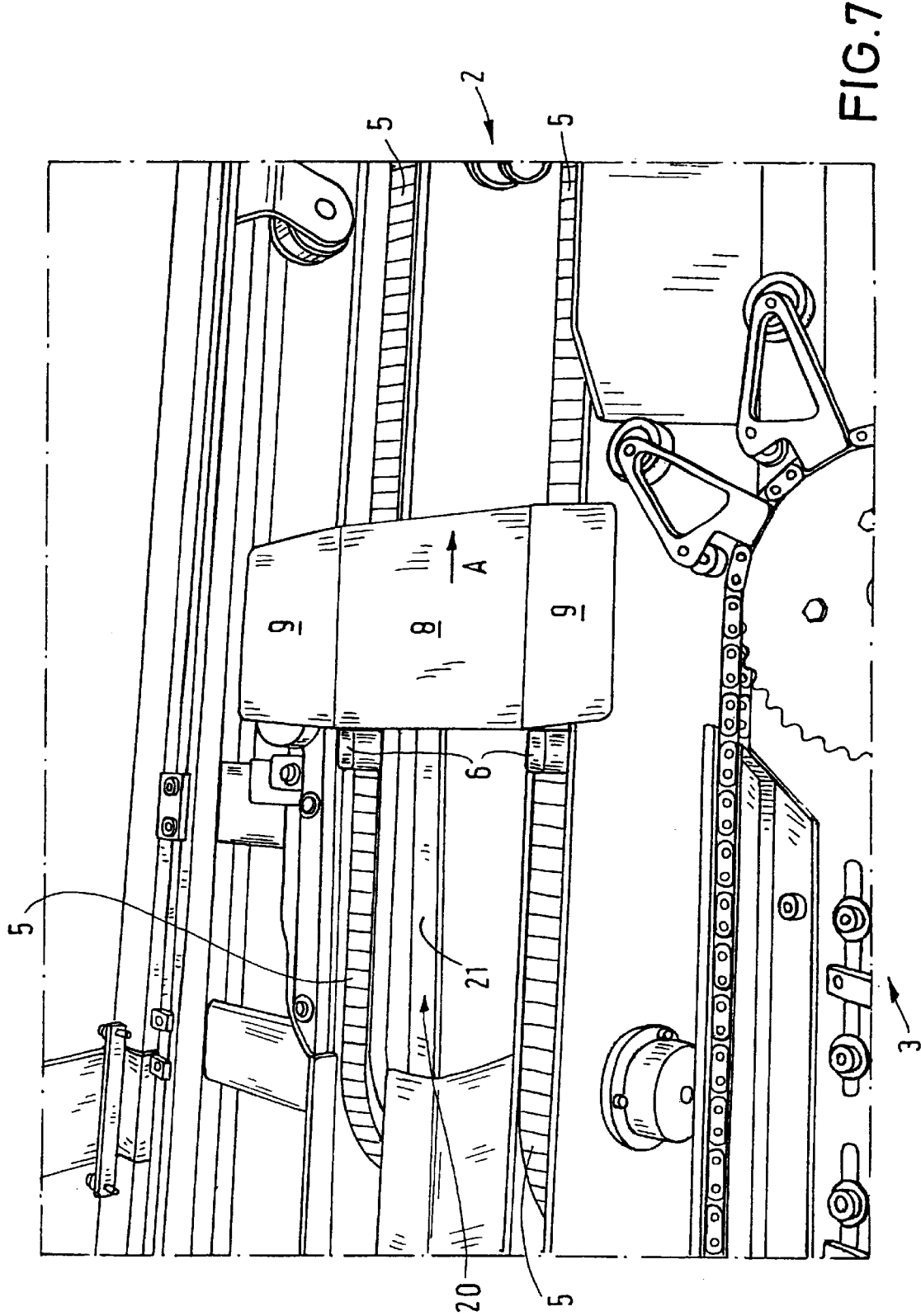

In particular the view seen in FIGS. 1 and 3 illustrates the fact that the roller 39, when the elements 30 and 31 are travelling through the straight chain section 26, are arranged in line with that chain 4 of the first lane 1 which is adjacent to the rotation device 3. The rollers 39 for example have a diameter of 5 cm. The speed of revolution of the chain 24 is coordinated with respect to the conveying speed of the first and second lane, 1, 2, such that whenever a folding carton 7 is conveyed by means of the first lane 1 into the area of the rotation device 3, the following pair 29 of elements in the region of the trailing sprocket wheel 23 is pivoted inwards into the straight chain section 26. As a consequence, and this is illustrated in FIG. 3, the roller 39 of contact element 30 is brought up against the rear lateral section 11 of the folding carton 7, close to the side section 12 of the folding carton 7. At the same time the lid section 8 of the folding carton 7 is acted on adjacent to the side section 13 by the rollers 18 exerting the braking effect. It is only due to the eccentric action of the roller 39 of contact element 30 on the folding carton 7 that the latter, viewed from above, is rotated in an anti-clockwise direction; as can be clearly seen from FIG. 4, as the folding carton 7 is progressively rotated, the roller 39 of contact element 30 rolls over the rear side section 11 adjacent to the lower edge thereof, in the direction of side section 13 of the folding carton 7. FIG. 5 shows that the vertical edge furthest from the rotation device 3 is guided by a lateral straight edge 45, which perpendicular to the conveying direction A broadens out conically in accordance with the rotation operation and the maximum diagonal alignment of the packing box, so as to ensure that the folding carton 7 does not become wedged between the roller 39 of contact element 30 and the lateral straight edge 45. The rotation of the folding carton 7 through 90°, that is to say the rotation thereof into the desired final position, is limited by the support element 31 trailing contact element 30, the roller 39 of which support element then likewise bears against the rear side section 11 of the folding carton 7. The dynamics of the rotating operation mean that just before the folding carton 7 reaches the fully rotated position, it is conveyed more slowly in the conveying direction A than the pair 29 of elements, thereby causing the roller 39 of contact element 30 to again roll over the rear side section 11 towards the side section 12 of the folding carton 7. Once the 90° rotation is completed, there is accordingly sufficient room on the rear side section 11 for the two rollers 39 of the pair 29 of elements to rest against it. This situation is illustrated in FIG. 6. The inclination of the carrier rail 20 is so adjusted that with the folding carton 7 in the position seen in FIG. 6 it is only slightly supported, thus already introducing conveying forces via the two chains 5 into the folding carton 7 to a large extent. The folding carton 7 is only conveyed in a positive fashion when the driving dogs 6 of the chains 5 of the second lane 2 lay themselves against the side section 13 of the folding carton 7, as illustrated in FIG. 7.

The views depicted in FIGS. 3 to 7 show that the 90° rotation of the folding carton 7 can be accomplished with a very short conveying line, based on the conveying direction A. If the lanes 1 and 2, and thus chains 4 and 5, are operated at a fast conveying speed A, this necessarily means that the chain 24 of the rotation device 3 that receives the pair 29 of elements must also be operated at a fast speed. As a consequence the conveying line required to rotate the folding carton 7, while still short, will nevertheless be somewhat longer.

Figure 8:
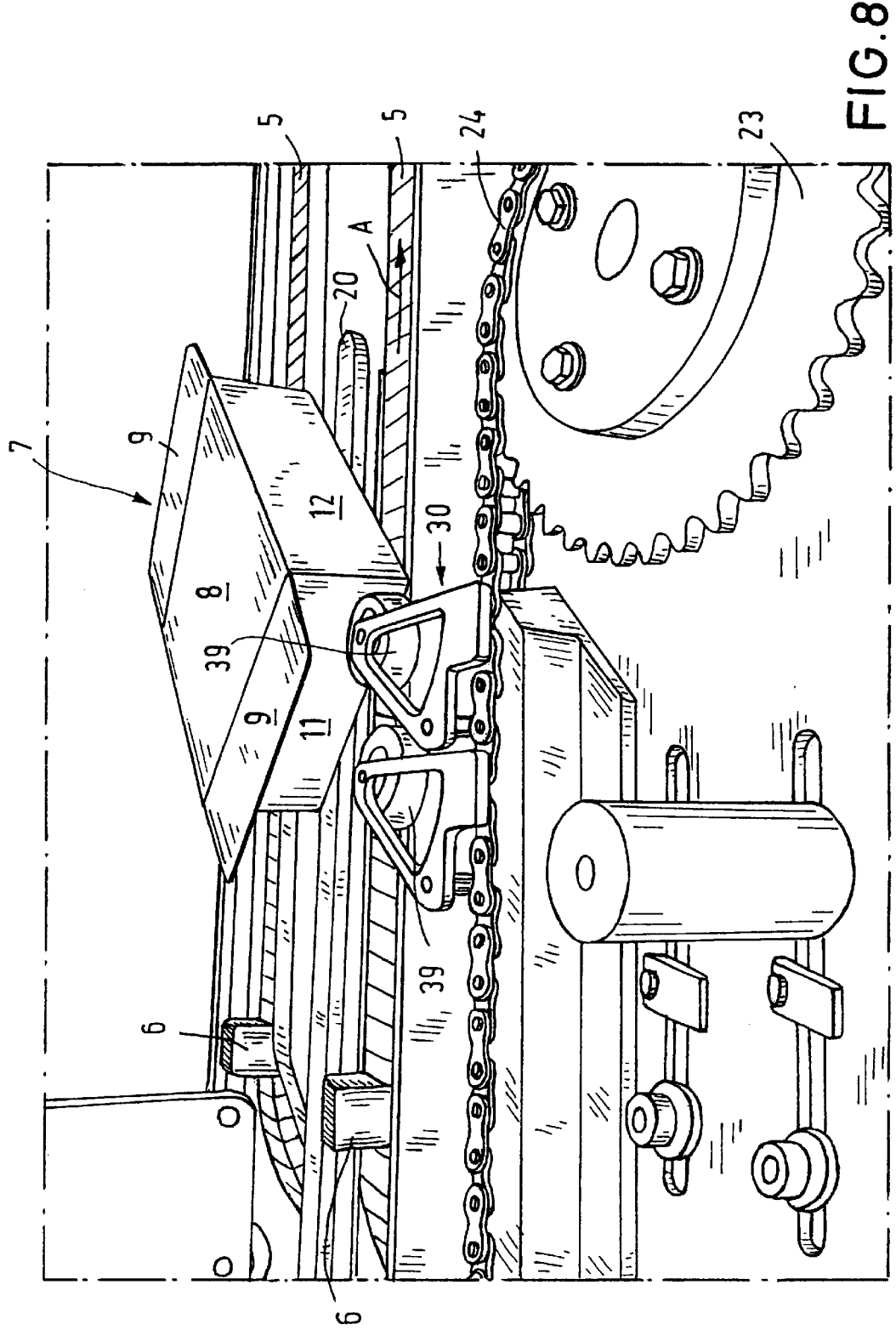
FIGS. 8 and 9 show a process step of a modified rotation device in which the vertical edge of the folding carton that is furthest from the rotation device is lowered into a space between two guide rollers.
Figure 9:
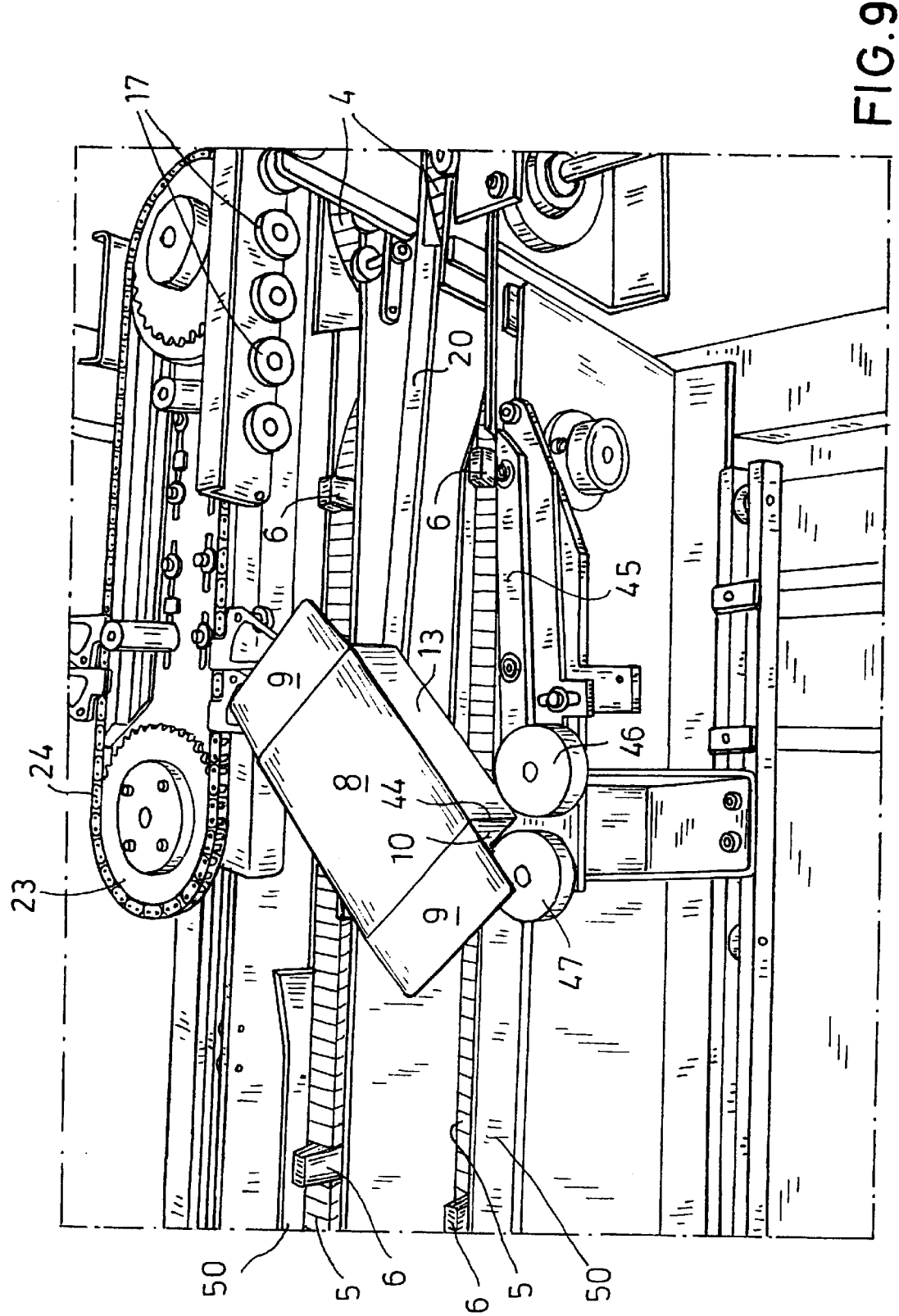

FIGS. 8 and 9 illustrate the conditions at a high conveying speed in respect of the stage during the rotational movement of the folding carton 7. There the position of the folding carton 7 corresponds more or less to that shown in FIGS. 4 and 5.–FIGS. 8 and 9 show that in the region of its vertical edge 44 the folding carton 7 is rotated into the space between two rollers 46 and 47 adapted to rotate freely about vertical axes, leaving an interspace 48 between the leading roller 47 and the trailing roller 46. The cylindrical rollers 46 and 47 are adapted to rotate freely about vertical axes 49. Rollers 46 and 47 have approximately the same diameter, for example a diameter of 7 cm, and are arranged in a line that extends parallel to conveying direction A. The distance of the rollers, 46 and 47 respectively, viewed perpendicularly to the conveying direction A, from the respective roller 39 of the pair 29 of elements operating on the folding carton 7, is roughly the same as the distance between the front and rear side sections 10, 11 of the folding carton 7. The edge 44 of the folding carton 7 is turned in between the two rollers 46 and 47; roller 46 makes contact with side section 13 and roller 47 with the front side section 10 and are able to roll off these sections slightly. With the folding carton 7 in the fully rotated position, the latter is conveyed out via the leading roller 47, and in the same way out of the region of the pair 29 of elements associated with the folding carton 7, with lateral guide rails 50 now taking over the guidance of the rotated folding carton.

What is claimed is:

1. A method for conveying and rotating an article along a conveying direction, the article having an underside, a first side lateral surface, a second side lateral surface, a front lateral surface and a rear lateral surface based on the conveying direction, comprising:
    conveying the article along a first lane in a direction of the first lane;
    rotating the article with a contact element that makes contact with the rear lateral surface of the article in order to re-align the article; and
    conveying the article along a second lane which extends in the direction of the first lane;
    wherein rotating the article includes moving the contact element in the direction of the first lane and against the rear lateral surface of the article, and making rolling contact with the rear lateral surface of the article.

2. The method for conveying and rotating an article as set forth in claim 1, further comprising:
    moving a support element in the direction of the first lane; wherein the support element is disposed to a rear of the contact element based on the direction of movement thereof and the support element makes rolling contact with the rear lateral surface of the article as the article is rotated.

3. The method for conveying and rotating an article as set forth in claim 2, further comprising:
    revolving the contact element and the support element.

4. The method for conveying and rotating an article as set forth in claim 1, wherein:
    rotating the article further includes moving the contact element adjacent to the first side lateral surface of the article;
    wherein the first side lateral surface extends in the direction of the first lane.

5. The method for conveying and rotating an article as set forth in claim 1, wherein:
    rotating the article results in a re-alignment of the article rotated through approximately 90°.

6. The method for conveying and rotating an article as set forth in claim 1, wherein:
    rotating the article includes conveying a region of the article situated opposite a contact area of the contact element and the article more slowly than the contact area with a movement component towards the lanes; wherein the second side lateral surface opposite the contact area and/or a lower face and/or an upper face of the article is acted upon by friction.

7. The method for conveying and rotating an article as set forth in claim 6, wherein:
    rotating the article includes:
    introducing a vertical edge of the article diametrically opposed to the contact area of the contact element between two rollers adapted to rotate about vertical axes;
    wherein the two rollers make contact with the second side lateral surface and the front lateral surface; and
    wherein the second side lateral surface and the front lateral surface are contiguous with the vertical edge.

8. The method for conveying and rotating an article as set forth in claim 7, wherein:
    rotating the article includes guiding the vertical edge diametrically opposed to the contact area of the contact element.

9. The method for conveying and rotating an article as set forth in claim 1, further comprising:
    guiding the second side lateral surface after the article has been rotated and upon operation of the contact element; wherein the second side lateral surface is distant from the contact element.

10. A conveying and rotating apparatus for conveying and rotating an article comprising:
    a first lane for conveying the article, the first lane having a conveying direction;
    a revolving conveyor device having a conveying line extending parallel to the conveying direction; and
    a contact element mounted in the revolving conveyor device, the contact element including a first freely rotatable roller for moving the article;
    wherein a support element is connected to the conveyor device; and
    wherein the support element includes a second freely rotatable roller for moving the article and is arranged so as to trail the contact element.

11. The conveying and rotating apparatus for conveying and rotating an article as set forth in claim 10, wherein:
    the revolving conveyor device includes a chain.

12. The conveying and rotating apparatus for conveying and rotating an article as set forth in claim 10, wherein:
    a plurality of pairs of elements are joined to the conveyor device, each pair of elements includes the contact element and the support element.

13. A conveying and rotating apparatus for conveying and rotating an article comprising:
    a first lane for conveying the article, the first lane having a conveying direction;
    a revolving conveyor device having a conveying line extending parallel to the conveying direction; and
    a contact element mounted in the revolving conveyor device, the contact element including a first freely rotatable roller;

wherein a support element is connected to the conveyor device; and wherein the support element includes a second freely rotatable roller and is arranged so as to trail the contact element; and a guide rail located parallel to the conveying direction of the first lane;

wherein the guide rail includes guide rollers.

14. A conveying and rotating apparatus for conveying and rotating an article comprising:

a first lane for conveying the article, the first lane having a conveying direction;

a revolving conveyor device having a conveying line extending parallel to the conveying direction; and a contact element mounted in the revolving conveyor device, the contact element including a first freely rotatable roller for moving the article;

wherein a support element is connected to the conveyor device; and wherein the support element includes a second freely rotatable roller for moving the article and is arranged so as to trail the contact element; and a second lane for conveying the article;

wherein a relative position of the first freely rotatable roller and the second freely rotatable roller of the first lane and the second lane, respectively, form a line that extends parallel to a direction of the second lane as the first freely rotatable roller and the second freely rotatable roller travel down a conveying line.

15. The conveying and rotating apparatus for conveying and rotating an article as set forth in claim 14, wherein:

driving dogs are provided to guide the contact element and the support element during a conveying operation along the conveying line.

16. The conveying and rotating apparatus for conveying and rotating an article as set forth in claim 14, wherein:

the contact element rests against the support element as the contact element and the support element move along the conveying line.

17. The conveying and rotating apparatus for conveying and rotating an article as set forth in claim 14, wherein:

the second lane is arranged laterally offset with respect to the first lane away from the revolving conveyor device; and a carrier rail is arranged in the second lane in a region of the conveyor device, the carrier rail being adapted to be adjusted in a direction of offset;

wherein a carrying level of the carrier rail is slightly higher in an entrance zone of the second lane than a carrying level of the second lane.

18. The conveying and rotating apparatus for conveying and rotating an article as set forth in claim 17, wherein:

the carrier rail is adapted to be pivoted about a vertical axis.

19. The conveying and rotating apparatus for conveying and rotating an article as set forth in claim 17, wherein:

a pressing element is located in an entrance zone of the revolving conveyor device above the carrying level of the first lane and the second lane;

wherein the pressing element is adapted to be brought into contact with a lid surface of the article.

20. The conveying and rotating apparatus for conveying and rotating an article as set forth in claim 19, wherein:

the pressing element is configured as a frictional rotatable roller.

21. The conveying and rotating apparatus for conveying and rotating an article as set forth in claim 14, wherein:

the width of the first lane and the width of the second lane are adjustable.

22. The conveying and rotating apparatus for conveying and rotating an article as set forth in claim 14, wherein:

the second lane includes a guide on a side of the second lane furthest from the conveyor device;

wherein the guide is arranged substantially parallel to the conveying line.

23. The conveying and rotating apparatus for conveying and rotating an article as set forth in claim 22, wherein:

the guide is configured as a guide rail.

24. The conveying and rotating apparatus for conveying and rotating an article as set forth in claim 23, wherein:

the second lane has two rollers on a side furthest from the conveyor device; and the two rollers are adapted to rotate freely about vertical axes and are spaced a short distance apart from one another.

25. The conveying and rotating apparatus for conveying and rotating an article as set forth in claim 24, wherein:

the guide is interrupted and includes the two rollers in an interrupted zone;

the contour of the two rollers being substantially in alignment with a guide surface of the guide.

26. A conveying and rotating apparatus for conveying and rotating an object comprising:

a first path for conveying the object, the first path having a conveying direction; and a circulating conveyor device having a conveyor track for conveying the object, the conveyor track having a conveying line extending parallel to the conveying direction;

the circulating conveyor device including a contact element, the contact element including a first freely rotatable roller for moving the object;

the circulating conveyor device further including a support element configured to follow the contact element, the support element including a second freely rotatable roller for moving the object.

27. The conveying and rotating apparatus for conveying and rotating an object as set forth in claim 26, wherein:

the circulating conveyor device includes a chain.

28. The conveying and rotating apparatus for conveying and rotating an object as set forth in claim 26, wherein:

a plurality of pairs of elements are joined to the circulating conveyor device, each pair of elements includes the contact element and the support element.

29. The conveying and rotating apparatus for conveying and rotating an object as set forth in claim 26, further including:

a guide rail located parallel to the conveying direction of the first path;

wherein the guide rail includes guide rollers.

30. The conveying and rotating apparatus for conveying and rotating an object as set forth in claim 26, further comprising:

a second path for conveying the object;

wherein a relative position of the first freely rotatable roller and the second freely rotatable roller of the first path and the second path, respectively, form a line that extends parallel to a direction of the second path as the first freely rotatable roller and the second freely rotatable roller travel down the conveying line.

31. The conveying and rotating apparatus for conveying and rotating an object as set forth in claim 30, wherein:

driving dogs are provided to guide the contact element and the support element during a conveying operation along the conveying line.

32. The conveying and rotating apparatus for conveying and rotating an object as set forth in claim 30, wherein:

the contact element rests against the support element as the contact element and the support element move along the conveying line.

33. The conveying and rotating apparatus for conveying and rotating an object as set forth in claim 30, wherein:

the second path is arranged laterally offset with respect to the first path away from the circulating conveyor device; and a carrier rail is arranged in the second path in a region of the circulating conveyor device, the carrier rail being adapted to be adjusted in a direction of offset;

wherein a carrying level of the carrier rail is slightly higher in an entrance zone of the second path than a carrying level of the second path.

34. The conveying and rotating apparatus for conveying and rotating an object as set forth in claim 33, wherein:

the carrier rail is adapted to be pivoted about a vertical axis.

35. The conveying and rotating apparatus for conveying and rotating an object as set forth in claim 34, wherein:

a pressing element is located in an entrance zone of the circulating conveyor device above the carrying level of the first path and the second path;

wherein the pressing element is adapted to be brought into contact with a lid surface of the object.

36. The conveying and rotating apparatus for conveying and rotating an object as set forth in claim 35, wherein:

the pressing element is configured as a frictional rotatable roller.

37. The conveying and rotating apparatus for conveying and rotating an object as set forth in claim 30, wherein:

the width of the first path and the width of the second path are adjustable.

38. The conveying and rotating apparatus for conveying and rotating an object as set forth in claim 30, wherein:

the second path includes a guide on a side of the second path furthest from the circulating conveyor device;

wherein the guide is arranged substantially parallel to the conveying line.

39. The conveying and rotating apparatus for conveying and rotating an object as set forth in claim 38, wherein:

the guide is configured as a guide rail.

40. The conveying and rotating apparatus for conveying and rotating an object as set forth in claim 39, wherein:

the second path has two rollers on a side furthest from the circulating conveyor device; and the two rollers are adapted to rotate freely about vertical axes and are spaced a short distance apart from one another.

41. The conveying and rotating apparatus for conveying and rotating an object as set forth in claim 40, wherein:

the guide is interrupted and includes the two rollers in an interrupted zone;

the contour of the two rollers being substantially in alignment with a guide surface of the guide.

* * * * *

UNITED STATES PATENT AND TRADEMARK OFFICE
CERTIFICATE OF CORRECTION

PATENT NO. : 6,425,475 B1
DATED : July 30, 2002
INVENTOR(S) : Georg Franta

It is certified that error appears in the above-identified patent and that said Letters Patent is hereby corrected as shown below:

Column 1,
Line 5, insert -- BACKGROUND OF THE INVENTION --.
Line 7, "f or" should be -- for --.

Column 5,
Line 19, insert -- BRIEF DESCRIPTION OF THE DRAWINGS --.

Signed and Sealed this

Twenty-eighth Day of January, 2003

JAMES E. ROGAN
*Director of the United States Patent and Trademark Office*